Patented June 2, 1953

2,640,778

UNITED STATES PATENT OFFICE 2,640,778

METHOD OF ENRICHING SUGAR WITH A VITAMIN COMPONENT AND PRODUCT DERIVED THEREFROM

William L. Owen, Baton Rouge, La.

No Drawing. Application March 26, 1951, Serial No. 217,666

15 Claims. (Cl. 99—11)

1

The present invention relates to the production of sugar containing an optimum amount of vitamin complex and particularly vitamin B complex distributed throughout the crystalline mass of the sugar.

More particularly, the present invention relates to the incorporation of a vitamin complex in sugar, as for example sucrose and the like, said vitamin complex having been produced by the growth of an Azotobacter culture in a substrate producing a vitamin B complex including thiamine, riboflavin, inositol, niacin, biotin, pyridoxin, and other vitamins.

It has been discovered that when *Azotobacter vinelandii* is grown in a suitable substrate, there is produced a vitamin complex that is absorbed by sugar throughout its crystalline mass in substantial quantities when a solution containing said vitamin complex in which the Azotobacter solution has been grown is added to a sugar syrup, when the latter is just about saturated and the crystals of sugar are ready to crystallize from the mother solution.

It has been discovered that sugar crystals will absorb throughout their crystalline mass a greater amount of the vitamin complex produced as herein described than other vitamins which are simply mixed with the sugar, that is added to the sugar crystals after the sugar crystals have crystallized and have been conditioned to a dry state. Compressed yeast is a fairly rich source of vitamin complex, including the B vitamins. It has been discovered that the vitamins present in autolyzed yeast can be incorporated in a mass of sugar crystals as they are about to crystallize in greater concentration than when a vitamin such as thiamine chloride is incorporated in the sugar crystals at the moment of their crystallization from the mother syrup.

It has also been discovered that even a greater concentration of the vitamin complex, and particularly the vitamin B complex including vitamin $B_1$, can be integrally incorporated throughout the mass of sugar crystals just at about the moment of the crystallization of the sugar crystals from its mother syrup provided the vitamin complex is one which has been grown in a solution containing a culture of Azotobacter, and particularly *Azotobacter vinelandii,* said solution containing a vitamin complex, and particularly the vitamin B complex including vitamin $B_1$.

The amount of vitamin complex absorbed by the sugar crystals from the solution produced by growing a culture of Azotobacter in a substrate known to produce vitamin complex, as herein set

2 forth, is outstanding. Moreover, the Azotobacter producing the vitamin complex is grown in a substrate containing as an energy growth ingredient a sugar, and more particularly sucrose or molasses, both of which are compatible with the sugar crystals to which the vitamin complex is added when the sugar syrup is in a saturated state with respect to its sugar component, and crystals of sugar are about to crystallize from their sugar syrup.

It has also been discovered that the Azotobacter culture, and particularly *Azotobacter vinelandii* synthesizes the vitamin complex in a substrate which can be added to the crystals of sugar just at their moment of growth, and that the vitamins developed by said growth process and the solution in which said vitamins have been grown do not produce on incorporation within the structure of the sugar crystals any objectionable odor, or any substance that is toxic, this being important in view of the fact that the sugar is an edible material.

It has also been discovered that after the synthesized vitamin complex produced by the growth of an Azotobacter, and particularly from *Azotobacter vinelandii,* has been added to the sugar crystals just as the latter are about to crystallize, it is advantageous to age the resulting mass comprising the vitamin complex and syrup to increase the size of the sugar crystals. Further, the aging process is advantageous as it provides a time period for the absorbed vitamin complex to become fixed within the interior structure of the sugar crystals. This aging is effected prior to separating crystals from the mixture of crystals and syrup, said mixture being technically known as the massecuite.

The invention will be illustrated by first setting forth an illustrative example of the manner in which the vitamin complex may be synthesized, this synthesis being effected by *Azotobacter vinelandii*. While this vitamin synthesis is well known, and is described in many text books, it is thought desirable to set forth the manner in which the inventor has synthesized the vitamin complex. However, the synthesis is not limited to the exact steps and conditions set forth. In other words, any of the standard prior art methods may be used to synthesize the vitamin B complex by Azotobacter, and particularly by *Azotobacter vinelandii*.

The isolation of *Azotobacter vinelandii* is effected from soil in the following manner. An Erlenmeyer flask of a suitable capacity, as for example 200 cc., is provided with 50 cc. of sterile mannitol solution, and there is added thereto a small proportion of surface garden soil. The amount of the inoculum need not be more than one to three grams, even less where the soil is rich in these species of bacteria. The flask is then incubated at a temperature varying between 30-34° C. for about three to five days until there are visible evidences of Azotobacter growth as revealed in the characteristic surface film that they form. The composition of the mannitol solution is as follows:

| | | |
|---|---|---|
| Distilled water | cc | 1000 |
| Mannite | grams | 15 |
| $K_2HPO_4$ | do | 0.2 |
| $MgSO_4.7H_2O$ | do | 0.2 |
| NaCl | do | 0.2 |
| $CaSO_4.2H_2O$ | do | 0.1 |
| $CaCO_3$ | do | 5.0 |

When the films of Azotobacter have formed on the surface of this medium and the films have been examined microscopically to determine the purity of the cultures, so that the best of the cultures may be chosen for further purification, small portions of the films are then transferred by means of a platinum needle sterilized through the flame of a Bunsen burner, to the surface of mannitol agar. This agar has the same composition as the above solution with the addition of 1.5% agar for solidification. The plates are then incubated at a temperature of 30-34° C. for 3 to 5 days. The colonies or streaks developing characteristics of *Azotobacter vinelandii* are a greyish white translucent growth, and the colonies have whitish centers. Microscopical examination of smears from these colonies shows pure cultures of the desired species.

Transfers are made by means of a sterile platinum loop to a sterile 50 cc. portion of mannitol solution present in a 200 cc. Erlenmeyer flask. A series of flasks are provided. Each of these flasks is then incubated as previously described, and when the film characteristic of Azotobacter has formed, the entire contents of each flask, including the film, is transferred to 1000 cc. of a molasses substrate which has the identical composition as the mannitol solution of substrate above set forth, with the exception that for the mannitol or the mannite there has been substituted 30 grams of molasses. This substitution is made in order to make the sugar content of the substrate containing molasses energy component equivalent to a substrate containing mannite, it being pointed out the molasses usually contains between 50 and 55% total sugars. The composition of blackstrap molasses, that is cane molasses which is used in the substrate is as follows:

| | |
|---|---|
| Brix | 80-85 (Pct. solids) |
| Sugar including sucrose and invert sugar | 50-55% |
| Water | 05-20% |

The other constituents are ash and non-sugars, the ash varying between 5 and 10%. The non-sugar constituents other than ash comprise gums and other colloidal material.

About 1,000 cc. of the molasses substrate is sterilized in a 3,000 cc. Erlenmeyer flask. The objective in using a large excessive capacity flask is to provide the Azotobacter with an abundance of air, it being pointed out that these microorganisms are aerobic. There are many substitutions that can be made in the substrate using the formula of Beijerinck, Lipman, Omeliansky, and others. The cane molasses is added in its original concentration and density, as specified above, in an amount of 30 grams by weight to 1,000 cc. of the substrate above set forth.

Referring to said substrate, some form of phosphates are essential, but they may be replaced by other phosphates or phosphorous compounds well known in the art. The calcium sulfate may be replaced by ferric sulphate. The function of the calcium carbonate is to neutralize the acids that may be formed or that are present in the acids when that material is used as a source of energy for *Azotobacter vinelandii*, it being pointed out that it is desirable that the pH of the substrate should preferably be between 6 and 7, that is the solution may be just on the acid side or just on the alkaline side, or neutral. The time of incubation is from 3 to 10 days, the maximum vitamin synthesis usually being between the fifth and eighth day. This of course varies with the vigor of the culture and the luxuriousness of the growth. While a vitamin solution may be used in which the culture has been grown from a period of 3 to 20 days, it is preferred to use the vitamin solution in which the culture has been grown or incubated from a period of three to eight days, and desirably between five and eight days. The vitamin solution resulting from growing cultures from ten days, and particularly the solution resulting from growing cultures after the tenth day and up to the twentieth day, shows some vitamin impairment, but said solutions can be used. In carrying out the present invention, it is best to use the vitamin complex produced by growing the Azotobacter and particularly the *Azotobacter vinelandii* not later than the tenth day of growth of the culture.

After the vitamin-complex enriching solution has been prepared, the next step is to prepare the sugar syrup or solution which it is desired to enrich with a vitamin complex. For this purpose, there may be used any of the ordinary sugars, but it is preferred to use a commercially refined granulated sugar. The physical properties such as size and grain and uniformity appear to be of relatively minor importance. In carrying out the present invention, it has been found that it is desirable to bring the sugar in solution with a minimum excess of water to thereby avoid the necessity of evaporating large quantities of water, or water-containing component, before the initiation of crystallization of sugar from the mother syrup. The sugar is first dissolved in distilled water, the proportions usually being in the ratio of 50 parts of sugar and 50 parts of water, or 60 parts of sugar and 40 parts of water. Obviously, these ratios of sugar to water may vary, the important point being to bring the sugar into solution with relatively little excess of water. The dissolved sugar solution is then introduced into a round bottom flask, for example, a two litre flask which is placed in a copper water bath, and the flame, as for example that produced by a Bunsen burner, is played upon the bottom of the water bath. The water is brought to a boil. The flask is provided with a rubber stopper containing two outlets, one of which is connected to the vacuum pump, and the other is adapted to receive a separatory funnel through which the solution containing the vitamin complex may be introduced into the flask containing the sugar.

The evaporating flask is connected to a Liebig type of condenser cooled by water flowing through the outside jacket, and the condenser is connected to a vacuum line connected to a water vacuum pump. When the syrup is evaporated to the desired point, that is when the syrup has evaporated to its sugar content, and the sugar crystals are about to develop, the stop cock to the separatory funnel is opened and the vitamin solution containing the vitamin enriching complex is introduced into the syrup. The resulting mass is then heated and the evaporation continued until the crystallization of the sugar crystals has been completed. The mixture of sugar and syrup may be separated in any desired manner. However, it is preferred to introduce the mixture of sugar crystals containing the absorbed vitamin complex through their crystalline structure and the syrup into a basket type of centrifugal. This effects the separation of the crystals from the syrup.

It is then desirable to wash the crystals free of mother syrup, and this may be satisfactorily accomplished by adding fresh syrup, that is a solution of pure cane crystals to the crystals in the centrifugal separating apparatus while the latter is spinning at a high rate of speed, as for example 1500 R. P. M. It is desirable to use from 1 to 2 litres of this washed syrup so as to be certain that the mother liquor is driven off of the crystals.

Before centrifuging the mixture of syrup and sugar crystals, it is desirable to age this mixture or massecuite. This aging functions to increase the size of the crystals and also insures the fixing of the vitamin complex throughout the crystal structure of the sugar crystals. This aging is preferably carried out at room temperature, that is around 20° C. or 68° F. However, the temperature can vary between about 45° F. and 75° F. The time of treatment is usually about twenty-four hours, but may be increased up to 48 hours. Generally, the time of treatment may vary between 15 hours and 48 hours. It may be pointed out that the crystallization of the sugar crystals occurs in a vitamin enriched mother liquor or a vitamin enriched syrup.

The invention will be illustrated in connection with the following examples:

EXAMPLE I 700 grams of refined granulated sugar was dissolved in 700 cc. of water. The resulting syrup was boiled and water distilled therefrom under a vacuum, as heretofore set forth in detail. 0.5 gram of thiamin hydrochloride was dissolved in 300 cc. of distilled water and added immediately to the syrup before crystallization was initiated. Thereafter, crystallization was initiated. Expressing the thiamin chloride in micrograms there was therefore added 500,000 micrograms of thiamin chloride. The recovery of the vitamin complex amounted to 18,000 micrograms, or a recovery of 3.6% based on the original 500,000 micrograms of vitamin B thiamin hydrochloride added to the sugar syrup.

EXAMPLE II 100 grams of a fine granulated sugar were dissolved in an equal weight of water, and the resulting vacuum distillation is herein set forth in detail. After the concentration of the syrup reached a point where crystallization had initiated, a yeast autolysate previously prepared was then added. This yeast autolysate was prepared from 87 grams of brewer's yeast which contained about 3480 micrograms of vitamin complex. 600 grams of sugar were recovered, said sugar assaying only 2.3 micrograms per gram of sugar, therefore a complete recovery of 1380 micrograms of vitamin complex out of the original amount of 3480 grams which showed a recovery of 39%. Although the B concentration including the $B_1$ concentration was low, the growth producing substances present in the recovered sugar were quite high, indicating that significant quantities of the growth producing substances had been incorporated within the crystals of the sugar. This test was made by taking 1 cc. of a suspension of yeast having a concentration of 320,000 cells per cc. and adding the same to 100 cc. of sugar solution producing a concentration of 3200 yeast cells per cc. The result of the tests as compared to tests made on a control are set forth in the following Table I.

Table I

| Solution of— | Yeast count, 24 hrs. | Haemycytometer per cc., 48 hrs. | Plate count per 96 hrs., cc. |
|---|---|---|---|
| Control Sugar | 73,600 | 164,000 | 250,000 |
| Vitamin Sugar | 1,000,000 | 2,320,000 | 6,000,000 |

While the incorporation of vitamins developed from an autolysate prepared from brewer's yeast shows a better incorporation of the vitamin complex and the sugar crystals, it is evident that the amount of vitamin B complex present in the yeast autolysate is not very efficiently incorporated in the sugar crystals, as for example the sucrose crystals upon their crystallization from the saturated syrup enriched with the brewer's yeast autolysate.

EXAMPLE III 773 grams refined granulated sugar are dissolved in an equal amount of water, and the resulting syrup evaporated under vacuum distillation is herein previously set forth. A solution of vitamin B complex produced by growing the Azotobacter in a sucrose medium instead of a molasses medium was added to the cane sugar syrup in the amount of 515 cc. of bacterial growth solution to the solution containing 773 grams of sugar. There was recovered 500 grams of sugar assaying 21 micrograms of vitamin B complex per gram. There was therefore adsorbed 10,500 micrograms of vitamin B complex and the vitamins supplied in culture form amounted to 16,995 micrograms per gram of sugar. The present recovery was therefore $$\frac{10,500}{16,995}=61\%$$

This conclusively shows that the vitamin B complex synthesized by a growth of *Azotobacter vinelandii* is a complex which is more easily and more readily assimilated by the sugar and is more easily incorporated within the interior structure of the sucrose crystals. The activity of the recovered vitamin sugar was tested by growing brewer's yeast in a solution made of the vitamin enriched sugar which was produced in the manner set forth by using the *Azotobacter vinelandii*. The suspension of yeast had a concentration of 2,000 cells per cc. A 20% solution of the sugar produced by Example III was tested and the results thereof are set forth in the following Table II.

Table II

| 20% solution made from sugar | No. of yeast cells per cc. | |
|---|---|---|
| | 48 hrs. | 72 hrs. |
| Control Sugar | 1,115,000 | 16,000,000 |
| Vitamin Sugar | 15,000,000 | 49,000,000 |

The presence of "growth factors" in the solution made from the vitamin enriched sugar is plainly indicated by the rapid growth of the yeast as compared with the control.

EXAMPLE IV

This experiment was repeated using molasses as a source of the energy in the substrate instead of cane sugar and the age of the culture solution at the time it was used was five days. There was recovered 500 grams of sugar assaying 23 micrograms of vitamin complex per gram of sugar. The percent of recovery was $$\frac{11,500}{16,985} = 67.5$$

In making the vitamin assay in every case more care was exercised to remove the vitamin entities from the outside of the sugar crystals by repeated washings of the crystals with a vitamin free solution of untreated refined cane sugar in water so that the vitamin assay would represent the vitamin complex that is within the crystals rather than those adhering to the crystals. While it is preferred to use the *Azotobacter vinelandii*, the pantothenic acid may be grown by using other *Azotobacter* species such as *Azotobacter chroococcum*, *Azotobacter agilis*, *Azotobacter beijerinckii*, and *Azotobacter vinelandii*. These are aerobic bacters. These bacterial forms are rather large, rod-shaped or coccobacillary bacteria which never produce spores, but which are sometimes motile. The aerobic Azotobacter included in the genus *Azotobacter vinelandii* is referred to in "Bacterial Chemistry and Physiology" by Porter, published 1946 by Wiley & Sons, pp. 663–665 inclusive.

In accordance with the present invention, sugar has distributed throughout its crystalline structure vitamin B complex expressed as hydrochloride, preferably in an amount of at least 20 micrograms of vitamin complex hydrochloride per gram of sugar. Utilizing *Azotobacter vinelandii* or its equivalents, the sugar has integrally incorporated throughout its mass 40 to 70% of vitamin B complex expressed as hydrochloride. In Examples II to IV, inclusive, the vitamin complex is recovered as the hydrochloride.

I claim:

1. The method of enriching sugar with a vitamin component comprising incorporating in a sugar syrup which is at about the point of crystallization, a solution containing a vitamin complex synthesized by growing a culture of *Azotobacter vinelandii* in a sugar-containing substrate, crystallizing from the resulting mass crystals of sugar having the vitamin complex incorporated within the interior structure of the crystals of sugar, and separating the so-produced sugar crystals from adhering syrup.

2. The method of enriching sugar with a vitamin component comprising incorporating in a sugar syrup which is at about the point of crystallization, a solution containing a vitamin complex synthesized by growing a culture of *Azotobacter vinelandii* in a sugar-containing substrate, and producing a massecuite containing sugar crystals and syrup, aging said massecuite to increase the size of the sugar crystals, and recovering from the aged massecuite crystals of sugar having the vitamin B complex incorporated within the crystal structure.

3. The method defined in claim 1 in which the substrate is a mollasses-containing substrate to provide for the growth of the *Azotobacter vinelandii* in a substrate containing as an energy component a sugar ingredient.

4. The method defined in claim 1 in which the sugar to which the grown *Azotobacter vinelandii* is added is sucrose.

5. The method defined in claim 2 in which the sugar syrup is sucrose syrup.

6. The method defined in claim 1 in which the substrate is a molasses-containing substrate and the sugar within which the vitamin complex is incorporated is sucrose.

7. Sucrose having distributed within its crystalline structure a vitamin complex synthesized by the growth of a culture of *Azotobacter vinelandii*.

8. Sucrose having distributed within its crystalline structure a vitamin complex synthesized by growth in a substrate containing cane molasses.

9. Sucrose having distributed throughout its crystalline structure a vitamin B complex in an amount of at least 20 micrograms per gram of sucrose.

10. The method of enriching sugar with a vitamin component comprising forming an aqueous sugar solution, heating said solution until sugar crystals are about to crystallize therefrom, introducing into the resulting sugar syrup a vitamin solution containing a vitamin complex synthesized by growing a culture of *Azotobacter vinelandii* in a sugar-containing substrate, heating the resulting mass until the crystallization of the crystals of sugar carrying said vitamin complex has been substantially completed, and separating the so-formed sugar crystals from the adhering syrup.

11. The method of enriching sugar with a vitamin component comprising forming an aqueous sugar solution, heating said solution until sugar crystals are about to crystallize therefrom, introducing into the resulting sugar syrup a vitamin solution containing a vitamin complex synthesized by growing a culture of *Azotobacter vinelandii* in a sugar-containing substrate, heating the resulting mass until the crystallization of the crystals of sugar carrying said vitamin complex has been substantially completed, centrifuging the mixture of sugar crystals and syrup to separate the crystals, and washing said crystals free of syrup.

12. The method defined in claim 11 in which the crystals are washed while being centrifuged with a fresh sugar syrup.

13. The method of enriching sucrose with a vitamin component comprising forming an aqueous sucrose solution, heating said solution until sucrose crystals are about to crystallize therefrom, introducing into the resulting sucrose syrup a vitamin solution containing a vitamin complex synthesized by growing a culture of *Azotobacter vinelandii* in a sugar-containing substrate, heating the resulting mass until the crystallization of the crystals of sucrose carrying said vitamin complex has been substantially completed, and separating the so-formed sucrose crystals from the adhering syrup.

14. The method of enriching sucrose with a vitamin component comprising forming an aqueous sucrose solution, heating said solution until sucrose crystals are about to crystallize therefrom, introducing into the resulting sugar syrup a vitamin solution containing a vitamin complex synthesized by growing a culture of *Azotobacter vinelandii* in a sugar-containing substrate, heating the resulting mass until the crystallization of the crystals of sucrose carrying said vitamin complex has been substantially completed, centrifuging the mixture of sucrose crystals containing the absorbed vitamin complex and syrup to separate the sucrose crystals, and centrifugally washing said separated crystals containing a residue of mother syrup with a fresh sugar syrup to remove said residue of mother syrup.

15. The method of enriching sucrose with a vitamin component comprising incorporating in a sucrose syrup which is at about the point of crystallization, a solution containing a vitamin complex synthesized by growing a culture of *Azotobacter vinelandii* in a sugar-containing substrate and thereby producing a massecuite containing sucrose crystals and syrup, ageing said massecuite at a temperature between about 45° F. and 75° F. for a period of between 15 and 48 hours to fix the absorbed vitamin complex within the sucrose crystals, and recovering from said massecuite the aged crystals of sucrose having the vitamin complex incorporated within the crystal structure.

WILLIAM L. OWEN.

References Cited in the file of this patent

UNITED STATES PATENTS

| Number | Name | Date |
|---|---|---|
| 1,686,670 | Leo | Oct. 9, 1928 |
| 2,044,194 | Visser | June 16, 1936 |
| 2,069,388 | Peebles | Feb. 2, 1937 |